J. Stimpson,
6715X R. R. Rails,
Patented Aug. 23, 1831.
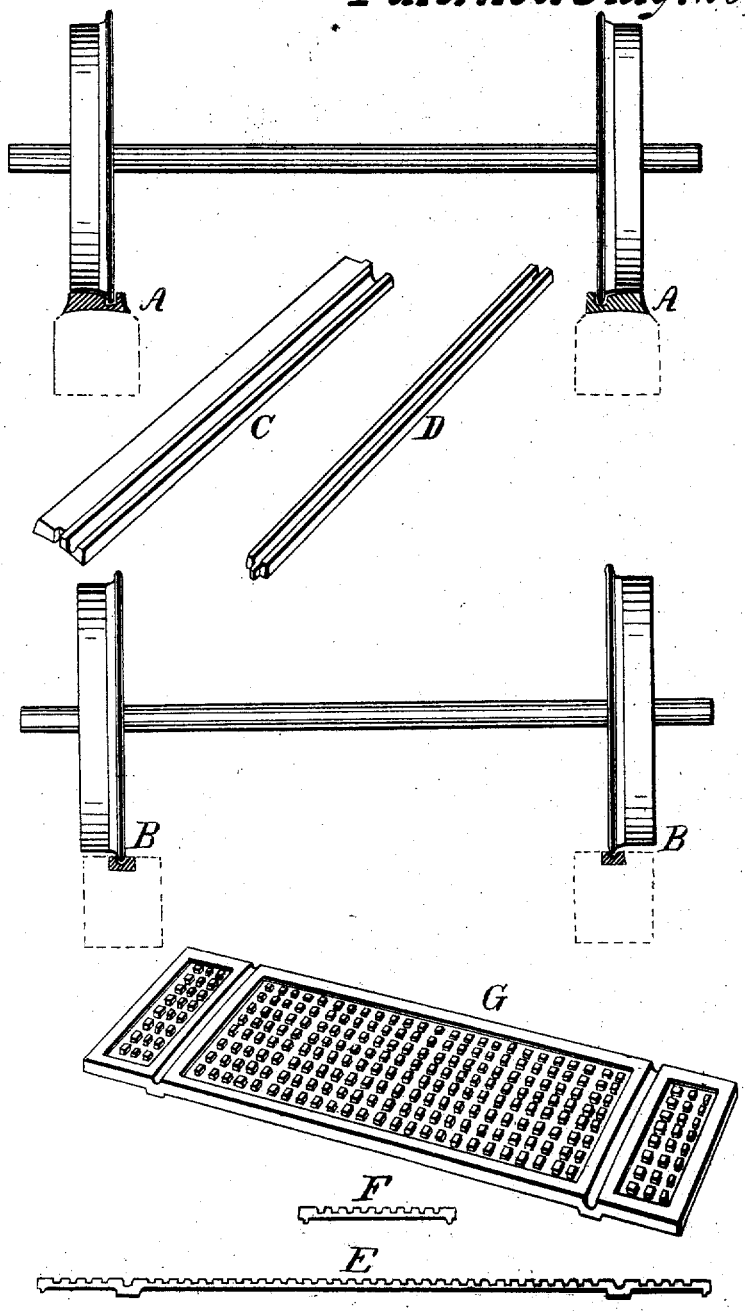

Aug 23 1831 6113X [illegible]

Reg. Sept 26 1835

* James Stimpson

Letters Patent

The Schedule referred to in these Letters Patent and making part of the same containing a description in the words of the said James Stimpson himself of his improvement in the mode of turning short curves on Rail Roads for which Letters Patent were granted dated the twenty third day of August 1831. which Letters Patent being hereby cancelled on account of a defective Specification ——

---

To all whom these presents shall come. Be it known that I James Stimpson of the City and County of Baltimore and State of Maryland have invented a new and useful improvement in the mode of turning short curves upon rail road with rail road carriages particularly those round the corners of streets wharves &c and that the following is a full and exact description of said invention or improvement as invented or improved by me Viz. Once or apply the common peripheries of the flanches of the flanches of the wheels for the aforesaid purpose in the following manner. I lay a flat rail which however may be grooved if preferred at the commencement of the curvature and in a position to be contact by under the flanches of the wheels upon the outer track of the circle so that no other part of the wheel which runs upon the outer circle of the track rails shall touch or bear upon the rails but the peripheries of the flanches they bearing the whole weight of the load and carriage while the opposite wheels which run upon the inner track of the circle are to run and bear upon their treads in the usual way and their flanches run freely in a groove or channel, which treads are ordinarily about three inches in diameter less than the peripheries of the flanches. Were the bearing surfaces of the wheels which are in contact with the rails while thus turning the curve to be [illegible] by straight lines from every point there would then be formed the frustums of two cones (of three before wheels and two axles to the carriage) or of but one axle and two wheels then but one cone, which frustums, or the wheels representing their operation will if the wheels are thirty inches in diameter and are coupled about three feet six inches apart turn a curve of about [illegible] feet of the inner track rail. The difference in diameter between the flanches and treads before stated, the [illegible] of the [illegible] and the wheels coupled

[* Extended for [illegible] years from 23d August 1845.]

[illegible]

coupled as stated would turn a curve of a somewhat smaller radius if the axles were not confined to the carriage in a parallel position with each other but this being generally deemed necessary the wheels run upon lines of tangents and thus upon the inner track. Being as wide apart in the coupling as the outer ones keep constantly inclining the carriage outwards and thus cause the carriage to tend to run upon a larger circle than the difference in diameter of the treads and flanches would otherwise give but the depth of the flanches and the coup-lings may be so varied as to turn any other radius of a circle desired. What I claim as my invention or improvement is the application of the flanch-es of the wheels on one side of each road carriage and of the treads of the wheels on the other side, to turn curves upon railways particularly such as turn-ing the corners of the streets, wherever &c in cities and elsewhere operating up-on the principle herein set forth Witnesses James H. Stimpson Geo. G. Berriman James Stimpson Exd.
M.G.L.

[645 [illegible]]

(Drawing)